United States Patent [19]

Weislogel et al.

[11] Patent Number: 4,606,387

[45] Date of Patent: Aug. 19, 1986

[54] MACHINE AND METHOD FOR TRIMMING A STACK OF VENEERS

[75] Inventors: Horst D. Weislogel, Gerlingen; Burkhard Oelte, Schw. Hall, both of Fed. Rep. of Germany

[73] Assignee: Carl Rückle Maschinenbau GmbH, Fed. Rep. of Germany

[21] Appl. No.: 700,394

[22] Filed: Feb. 11, 1985

[30] Foreign Application Priority Data

Feb. 9, 1984 [EP] European Pat. Off. ........ 84101309.7

[51] Int. Cl.[4] .............................................. B27B 1/00
[52] U.S. Cl. ...................................... 144/356; 83/29; 83/255; 83/404; 83/733; 144/3 N; 144/2 R; 144/367; 144/242 G; 198/403; 414/677
[58] Field of Search ........................ 83/29, 36, 39, 267, 83/411 R, 733, 255, 404, 367; 414/677; 144/3 N, 2 R, 3 R, 356, 357, 367, 369, 358, 242 G; 198/403

[56] References Cited

U.S. PATENT DOCUMENTS

| | | | |
|---|---|---|---|
| 2,527,024 | 10/1950 | Mitchell | 198/403 |
| 2,761,361 | 9/1956 | Hornberger et al. | 198/403 |
| 2,822,003 | 2/1958 | McCahun et al. | 83/404 |
| 3,171,452 | 3/1965 | Nyden | 83/255 |
| 3,777,598 | 12/1973 | Campbell | 83/29 |
| 4,220,239 | 9/1980 | Prichard, Jr. | 198/403 |

Primary Examiner—W. D. Bray
Attorney, Agent, or Firm—McGlew and Tuttle

[57] ABSTRACT

In a method and assembly for trimming a stack of veneer sheets, both lengthwise and transverse cutting lines are determined in advance by means of a director light projecting a line. The position data of the determined line are processed by a computer to control the feed to a cutting plane. Alternatively, the cutting lines are marked. The stack is firmly clamped between conveyor belts of a mechanism by which, after the first lengthwise trimming, the stack is turned upside down, after the same procedure for determining the cutting line, fed to the cutting plane. The transverse trimming is effected in similar fashion.

46 Claims, 2 Drawing Figures

MACHINE AND METHOD FOR TRIMMING A STACK OF VENEERS

FIELD AND BACKGROUND OF THE INVENTION

The present invention relates in general to the field of veneer processing, and in particular to a new and useful machine and method for trimming the longitudinal edges of a stack of veneers, the machine and method being associated with a device for determining or applying at least one lengthwise cutting or reference line on the stack.

Machines of this kind are known in various designs. The device for determining the cutting line is usually located in the cutting area. The cutting line is determined with the aid of a so-called director light which falls on the surface of the top veneer of the stack. This line of light permits the determination of where the stack edge is to be cut. The cutting line will primarily be determined by the contour of the edge. It must extend so as to trim the stack over the entire length thereof and obtain a neat edge on every veneer. Care must be taken in addition to cut away knots or other defects in a marginal zone of the veneer. If the director light is placed so as to determine the cutting line directly by the line of light, the cutting operation can be started instantly. The same applies to cuts which may be needed in the transverse direction. During the cutting operation, the veneer stack is placed on a truck or another carriage, with which it is moved under the director light until the light marks the correct line.

After the first trimming operation, the stack is retracted, removed from the truck, turned through 180°, and again placed on the truck for displacement in the direction of the cutting plane, for determining the second cutting line, and effecting the second cutting operation.

Another prior art machine of this kind operates in a similar way, only the reference light is not in the cutting area, it is provided between the cutting area and the operator. Upon determining the first, lengthwise cutting line, a stop is set. The truck is then moved in the direction of the cutting plane until another stop butts against the set stop. The cutting line is thereby brought into coincidence with the cutting plane, and the cutting operation may start without further checking.

With this machine also, the stack must be retracted, turned, and again advanced to perform the second cutting operation. This turning, which is effected manually, involves the risk that the individual veneers will be displaced relative to adjacent ones in the stack, and then cut to a different size. Further, it may happen that one or even a plurality of displaced veneers will not have a neatly cut edge. Even veneers with non-parallel edges may thus be produced.

SUMMARY OF THE INVENTION

The present invention is directed to an improved method and machine of the above mentioned kind, which eliminates or at least substantially reduces the risk of displacing individual veneers or groups thereof within a veneer stack during a trimming operation. Also, this operation is accelerated without unfavorably affecting the exact positioning. Further, determining or marking of the cutting lines is facilitated as far as possible.

Accordingly an object of the present invention is to provide a machine for trimming the lengthwise edge of a stack of veneers which is associated with a device for determining or applying at least one lengthwise cutting line, cutting mark or reference line parallel to the cutting line, the machine including a turning mechanism having an axis of rotation parallel to the surface of the stack being at the same time designed as a mechanism for holding the veneer stack, with the determining or marking device being provided in front of the turning mechanism or at an entrance area thereof.

After the first lengthwise cut, the stack is turned while being firmly held in the turning mechanism or carriage, and then again advanced to the cutting area in a predetermined position. This makes sure that the individual veneers of the stack will remain in an exact mutual position, to obtain the desired result. Since the device for determining or marking the cutting line is provided ahead of the turning carriage or in the end area thereof, the cutting lines for the next two cutting operations must be determined or marked outside, or during the introduction into, the turning carriage.

The above description relates only to a determination by means of a director light, since this is the most common and relatively fastest manner. Another possibility is to actually mark the cutting line, for example, by printing, and then let a detector search for the markings and also stop the stack at the cutting plane. The marking may be provided directly in the cutting line, or a reference line may be printed, also for the detector, with the cutting being effected some distance to one side of the line, for example to cut away also the reference line. Reference lines, however, are less important than directly marked or light lines. For this reason, they are mentioned in the following only occasionally without the intention of thereby limiting the scope of the invention.

A development of the invention provides that a feed mechanism for advancing the veneer stack into the cutting area is controlled by the determining or marking device or data determined by such a device. This control may be effected, for example, in a way such that after determining or marking the cutting line, the instantaneous position of the stack is ascertained, such as by coordinates, and the data are automatically or manually entered into the feed mechanism, by which then the advance up to the cutting plane is effected. The same applies to the second cut, only the distance from the cutting plane and the turning must be taken into account. The data are preferably constant. If also transverse cutting is provided, the respective data may again be employed for automatic operation.

Another object of the invention is to provide such a machine and method wherein the turning and holding mechanism is, at the same time, designed as a mechanism for feeding the stack. In this way the same mechanism can be used to move the stack into the cutting plane, for the second cutting operation. The feed motion may even be started already during the turning of the stack.

Another feature of the invention provides that the holding, turning and feeding mechanism, is proceeded by a transfer mechanism which is provided, or cooperates with a register stop or the like. The stack is placed, mostly manually, on the transfer mechanism and brought into register at the stop. Then, the cutting lines are determined or marked, which may be combined with the transfer into the hold-turn-feed mechanism.

Care must be taken to prevent the stop from hindering or even preventing the transfer.

Still another development provides that the transfer mechanism is at the same time a part of the determining or marking device and the determining or marking device is equipped with a director light or a marking unit. By means of the transfer mechanism, the veneer stack is displaced relative to the stationary determining or marking device, until the correct cutting line is determined or marked. The same goes for the later determination of the second lengthwise cutting line. If transverse lines are provided, the stack may for this purpose, also be held fast in the transfer mechanism.

According to a further development and with a director light which is fixed relative to the cutting plane, the invention includes the detector light mounted at a fixed location relative to the cutting plane and the register stop being mounted in a fixed relationship with respect to the light. The stop can be lowered and the transfer mechanism is displaceable back and forth between two end positions over the now lowered stop. Upon bringing the stack into register at the lowerable stop, the stop is lowered into an ineffective position, so that the transfer mechanism with the stack held thereon can be displaced toward the device for determining or marking the first cutting line, provided that the determination or marking have not been effected already prior to the lowering of this register stop. After the determination or marking, the transfer mechanism is further displaced, to do the same for the second cutting line, and then also for transverse cutting lines, which may be done even earlier. The register stop is thus overtravelled by the transfer mechanism which, at least upon arriving at its second end position and along with the stack, then protrudes at least a certain distance into the hold-turn-feed mechanism. This latter mechanism, of course, must not only be correspondingly designed, but also open so as to be capable of receiving the stack without hindrance by holding elements, etc. Upon transferring the stack the transfer mechanism is retracted to its initial position.

In a particularly preferred embodiment of the invention, the register stop is offset relative to the plane of the director light, toward the hold-turn-feed mechanism, by a distance of the so-called "minimum joining loss" which is generally associated with the thickness of material lost due to the cutting operation proper. Consequently, upon applying the stack against the register stop, the director light already marks a lengthwise cutting line ensuring a cut with a minimum joining loss. If a large margin is to be cut, the register stop must first be lowered and then the stack along with the transfer mechanism must be displaced through the desired distance toward the cutting plane. The same goes for a provided marking of the stack.

A still further object of the invention is to provide such a machine and method wherein the hold-turn-feed mechanism comprises two oppositely circulating endless conveyor belts or the like, which are each trained over front and rear tail rollers or similar structures, with the belt sections extending parallel and being driveable in both a forward and reverse direction. For various reasons, it is advantageous not to use belts having a width equal to the length of the veneer stack, but instead to use, both above and below, groups of spaced apart narrower belts. Advantageously, the working section of the lower belt or belts extends at least partly above a table of the machine.

According to another development of the invention, a gap between the conveyor belts for receiving a stack of veneers, is enlarged with the two conveyor belts being movable apart from each other, which means that the lower belt is movable downwardly and the other upwardly. This is of importance particularly for introducing the stack and removing it after the trimming. Another modification of the invention provides that the axis of rotation of the hold-turn-feed mechanism extends approximately in the plane of the upper section of the lower conveyor belt, with both the conveyor belts being displaceable transversely to the plane of their sections applying against the stack, and in synchronism, by about a distance corresponding to the maximum permitted thickness of the stack. Unequally thick veneer stacks may thus be trimmed without difficulties. However, since after turning the veneer stack would come into a position too low by a stack thickness, relative to the cutting device, a lifting of the stack by this thickness must be provided, during or after the turning. To maintain the firm holding together of the stack, the two parts of the holding mechanism must be lifted in synchronism. With a suitable control, this is simple and raises no problems. Advantageously, hydraulic lifting equipment is provided for this purpose.

It is further provided that, advantageously, in the initial position of the trimming mechanism, the supporting surface of the lower conveyor belt extends at about the same level as the supporting surface of the transfer mechanism. The transfer and reception operation are then without problems. After introducing the stack, the lower conveyor belt is lifted until the stack reposes thereon. The transfer mechanism may then be brought into its initial position.

It is further provided that the cutting plane extends at a distance from the axis of rotation from the hold-turn-feed mechanism, which is equal to the spacing of the director light plane from the rotational axis of the mechanism. The advance of the veneer stack, after determining the second lengthwise cutting line, to the cutting plane is thus particularly simplified. The same goes for the other advance of the stack to the cutting plane after the turning. The distance of advance corresponds to the difference between the spacing of the light from the cutting plane minus the predetermined width of the stack between the two cutting lines.

While providing, in accordance with the invention, that the hold-turn-feed mechanism and the transfer mechanism are together pivotable, within limits and in both directions starting from a median normal position, about a vertical axis which is perpendicular to the axis of rotation of the hold-turn-feed mechanism as well as to the planes in which the veneers extend, even lengthwise cutting lines forming an angle with each other can be determined in a simple way. The director light or the like, of course, does not follow this pivotal movement. In addition, and advantageously, the respectively reached pivotal position is secured by a suitable arresting element. This introduces a particular economy into the trimming of veneer stacks, which may even be useful if particular effects are sought or in instances where an oblique joining line in the grain pattern does not cause problems.

According to another preferred embodiment of the invention, a lifting pressure bar and an oppositely positioned lowerable cutting bar, or a lowerable lower blade, are provided, considered in the feed direction between the hold-turn-feed mechanism, but before the cutting blade. In normal instances, the cutting operation is performed with the upper cutting blade which can be fed in. To remove the veneer stack, it may be advantageous to displace the cutting bar, or a lower, lowerable cutting blade, into an ineffective position, such as a lower position. The pressure bar is fed in only after the veneer stack has been correctly positioned relative to the cutting plane. This bar operates with the lowerable cutting bar in a way such that the stack is clamped therebetween and can no longer open along the edge to be cut. The lowering of the cutting bar has the further advantage of permitting the advance into the cutting area of a stack which may be slightly spread open at its leading edge and might thus get caught at the pressure bar. A loosening may be caused by the fact that while being advanced into the cutting area, the leading portion of the stack loses its firm hold in the hold-turn-feed mechanism, while the bulk of the stack is still held fast. This may even cause mutual displacement of the veneers.

Another development of the invention utilizes an additional conveying mechanism which can be aligned with the hold-turn-feed mechanism and brought into a working position. This additional conveying mechanism is behind the cutting plane considered in the feed direction for the stack. The conveying mechanism can be brought into a transfer position in a simple way if the cutting bar is lowered. On the other hand, this additional conveying mechanism cannot permanently be kept in a position associated with the cutting plane, because the cut-off waste must be removed downwardly into the space between the cutting plane and the adjacent end of this conveying mechanism, for example through a chute which may be followed by a station for processing the waste, for example a chopper.

Still another development provides that the additional conveying mechanism bridges the space between the machine for cutting the lengthwise edges of the stack and an additional device for trimming at least one of the transverse edges of the stack. The additional conveying mechanism may be assembled to a unit with this additional trimming device. Should no trimming of the transverse edges be provided, the additional conveying mechanism may carry the veneer stack taken from the cutting device to another station or to a discharge conveyor.

Another advantageous feature of the invention is that the additional trimming device is designed as a two-side trimming machine for both of the transverse edges, and particularly as a device for applying at least one adhesive tape to the stack. For this latter purpose it is advantageous to align the cutting blades with the determined cutting lines and arrest the stack.

A development of the inventive machine provides that the determining or marking device is designed to determine and mark two lengthwise and two transverse lines. With such a design, the final dimensions of the veneer stack can fully be determined already prior to the first cut. This also contributes to an overall acceleration of the operation.

To be able to correctly align the stack, which was already trimmed on its lengthwise sides, with the cutting blades of an additional trimming device, it is provided that the additional trimming comprises a lowerable register stop for the lengthwise stack edge leading in the feed direction. In the lowered position, the register stop makes possible an unhindered further transport of the stack after transverse trimming.

In a preferred embodiment, the additional trimming device is equipped at either side with a cutting unit which can be fed in the lengthwise direction of the stack, and which comprises at least one in-feed pressure bar or hold-down, and one in-feed cutting bar or in-feed lower blade, and one in-feed cutting blade. These cutting units are aligned with the stack and started preferably simultaneously. If marked lines are used, the alignment operation starts as soon as the detectors have sighted the markings, while with a determination of cutting lines, the stack is fed under a corresponding control, during which the cutting units are connected to the determining device.

A still further object of the present invention is to provide a machine in which the additional trimming device is followed in the feed direction, by a delivery mechanism whose receiving portion is associated with the discharge end of an additional conveying mechanism, while the position of the discharge end thereof is variable relative to the receiving portion. The trimmed veneer stacks may now be deposited one after the other on a pallet or the like. Upon filling up one pallet, the pallet is removed to the side or downwardly, to make room for another.

Another inventive feature is that the transfer mechanism is provided with, or controlled by, a position transmitter or the like cooperating with the determining device, with the distance between the two positions of the stack during the determination of the two lengthwise cutting lines forming a control parameter for the feed motion of the stack. While determining the first lengthwise cutting line, the instantaneous position of the transfer mechanism, and thus also of the veneer stack non-displaceably held thereon, is determined and, preferably entered into the program. Further determined through the position transmitter is the stack position for determining the second lengthwise cutting lines which, preferably, again is entered in the program. Since the distance between the position during the determination of the second lengthwise cutting line and the cutting plane is fixed, the first feed step through the hold-turn-feed mechanism is also fixed. To avoid transmission errors, the instantaneous positions or coordinates during the determination of the two lengthwise cut lines are preferably preserved, for example by pushing a key, and entered into the program. The zero point for the feed is given by the plane of the director light, etc. Simultaneously, or subsequently, the transverse cutting lines may be determined in the same way, and their values, thus a displacement in the Y direction, also preserved and entered.

According to another feature of the invention, the position transmitter marks the zero point of the displacement of the feed mechanism during the determination of the first lengthwise cutting line, or can be set to the displacement value zero. Another feature of the invention utilizes two measuring units or the like, for determining the transverse lines, the measuring units being equipped with one, or together being equipped with a common position transmitter or similar mechanism. This is for measuring the mutual spacing of the transverse lines.

Another feature of the invention is that the position transmitters for the two lengthwise and two transverse lines are connected to a computer for determining the area of each of the trimmed veneers of the veneer stack. The entire surface area which can be veneered with the veneers of this stack can thus be determined already before the first cut.

Another embodiment of the invention provides that the computer for determining the area of the veneers is connected to a printer for printing on adhesive tapes, accompanying papers or the like. The data acquired during the determination of cutting lines may thus be used not only for controlling feed by the hold-turn-feed mechanism and the initial cutting mechanisms, but also for additional operations of any kind, not least the making out of accompanying papers, invoices, etc., as well as direct printing of proper indications onto one or more adhesive tapes affixed in advance. Such tapes have the further advantage that they hold the trimmed stack together. This may be of importance for a further processing of the stack, for example, in a jointing machine.

According to another object of the invention, a device is provided for determining the height of the stack which is compressed during trimming. If the veneer thickness is known, which is the normal case, the maximum veneerable surface area may easily be computed from the measured height. It is particularly advantageous in such an instance to connect the device for determining the stack height to the computer where then the total area is computed. The computer may then cause printing of the resulting total area and/or of the stack height unto the adhesive tape, accompanying papers, etc. Even the price may automatically be computed.

As already mentioned, the invention also relates to a method which is carried out by the inventive machine. In this regard, the invention is directed to improve the prior art veneer trimming method so as to obtain a process which is faster, more accurate, and safer than before.

Accordingly an object of the invention is to provide a method for trimming a stack of veneers on at least two lengthwise edges thereof, carried out with the inventive machine summarized above, and providing turning of the stack through 180° between two cutting operations, and determining the two lengthwise cutting lines prior to introducing the stack into the cutting area of the trimming machine, and in addition during the determination, measuring the distance of each of the lines from the cutting plane and displacing the stack into the trimming machine through a distance equal to the spacing of the first cutting line from the cutting plane. The method is particularly characterized by turning the firmly held stack upside down by means of the turning mechanism and then displacing it through a distance equal to the spacing of the second cutting line from the cutting plane.

A further object of the invention is to provide such a method wherein the stack that is turned through 180° between the two cutting operations, is marked at two lengthwise cutting lines or reference lines which are parallel to the cutting lines, and offset therefrom by a predetermined distance, and prior to introducing the stack into the cutting area of the trimming machine. The stack is introduced into the trimming machine until the first line reaches the sight plane of a detector device, with the stack being held fast and simultaneously turned upside down by means of the turning mechanism and then advanced through the measured distance of the respective line or reference line for the sight plane of the detector device.

Unlike in the respective prior art method in which the veneer stack, after the first trimming, is brought back substantially into its starting position, and turned manually to be again advanced into the cutting zone for the next lengthwise cut, in the inventive method, the stack is held firmly clamped during its turning upside down, and the feed into the cutting zone is effected while the stack is still firmly clamped together, so that no displacement within the stack can occur.

Before introducing this stack into the cutting zone of the trimming machine, if no marking of the lengthwise cuts is provided, these cuts are only determined as a cutting line and at the same time also the spacing of each of the lengthwise cutting lines for the cutting plane is ascertained and utilized for a controlled feeding of the stack by means of the hold-turn-feed mechanism. This goes for both the first feed to the cutting plane and the second feed after the turning operation.

The operating steps are similar if marking lines or reference lines are applied, in which instance, however, no control is effected through the earlier determined values, and the stack is advanced until the respective marking line passes below and beyond a detector plane.

Advantageously, the two lengthwise cutting lines are determined prior to introducing the stack into a hold-turn-feed mechanism which is controllable through the determining device, or by entering into the program the corresponding data, especially the determined ones. The cutting lines can thus be definitely outside the hold-turn-feed mechanism so that a second stack may already be dimensionally entirely defined while the preceeding stack is still handled during the cutting operation.

The method is developed by providing a step of determining the two transverse cutting lines prior to introducing the stack into the hold-turn-feed mechanism which is controllable through the determining device or through entered data, particularly the measured values. These determined values, however, are of importance only after being transferred from the hold-turn-feed mechanism to the respective transverse cutter.

Another development provides the step of displacing the stack after determining the first lengthwise cutting line, by means of a hold-turn-feed mechanism which is controllable through the determining device or through the entered determined data, toward the cutting plane, and interrupting this feed motion to determine the second lengthwise cutting line. While determining the second cutting line, the stack is preferably in a position far, or completely, within the hold-turn-feed mechanism. The space needed for a machine carrying out this method may be slightly smaller. However, the position of the stack just submitted to the cutting operation must be taken into account while determining the cutting lines of the next stack.

Another modification of the inventive method comprises the operation of displacing the stack after determining the first lengthwise cutting line and the two transverse cutting lines, by means of a hold-turn-feed mechanism which is controllable through the determining devices or through the entered determined data, toward the cutting plane, and interrupting this feed motion to determine the second lengthwise cutting line. The process is substantially the same as the previous one, only two transverse cutting lines are determined after the first lengthwise one, before the second lengthwise cutting line is determined.

Another provided modification is determining the lengthwise cutting lines by means of a stationary detector light or other, preferably optical determining device which is provided at the entrance of the hold-turn-feed mechanism or any predetermined distance therefrom. With an automation of this operation, the director light may be replaced, for example, by a determining device automatically sensing the front edge of the fed-in veneer stack and permitting the determination of the lengthwise cutting lines only after the oblique or irregular front edge has advanced to this determining device along its entire length. The sensing is effected at points, or in portions.

Still other advantageous modifications of the method follow analogously from the above description of the machine and also from the description hereinafter of an embodiment of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
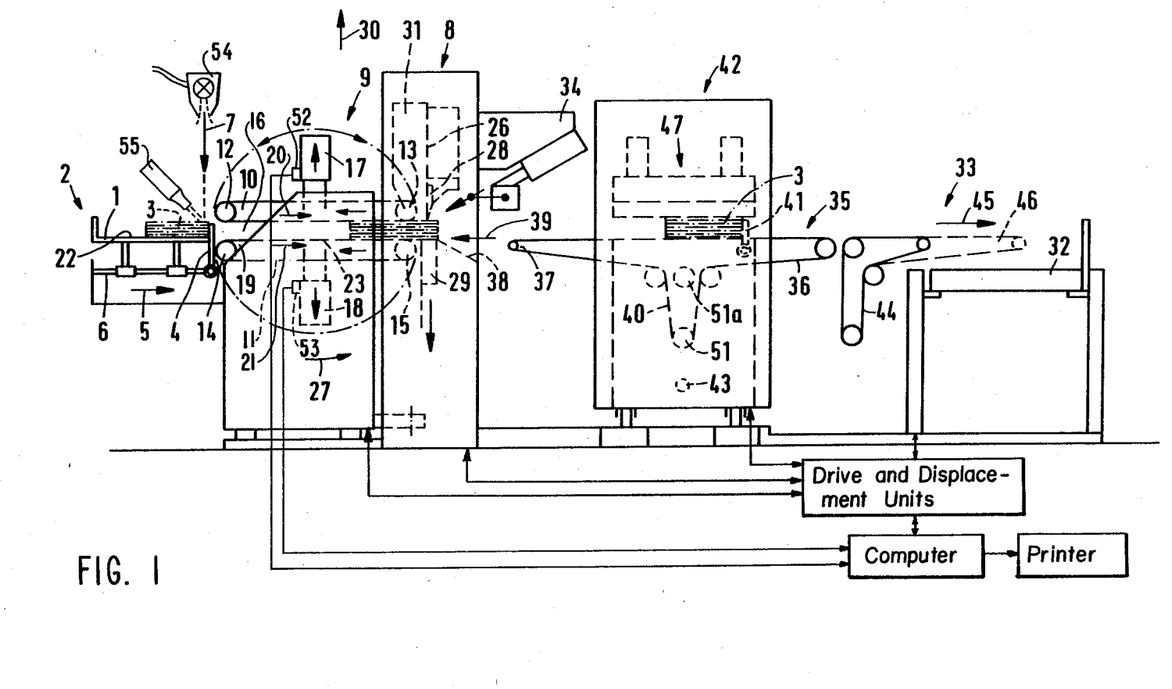
FIG. 1 is a side elevational view of an embodiment of the trimming machine and associated equipment in accordance with the invention.
Figure 2:
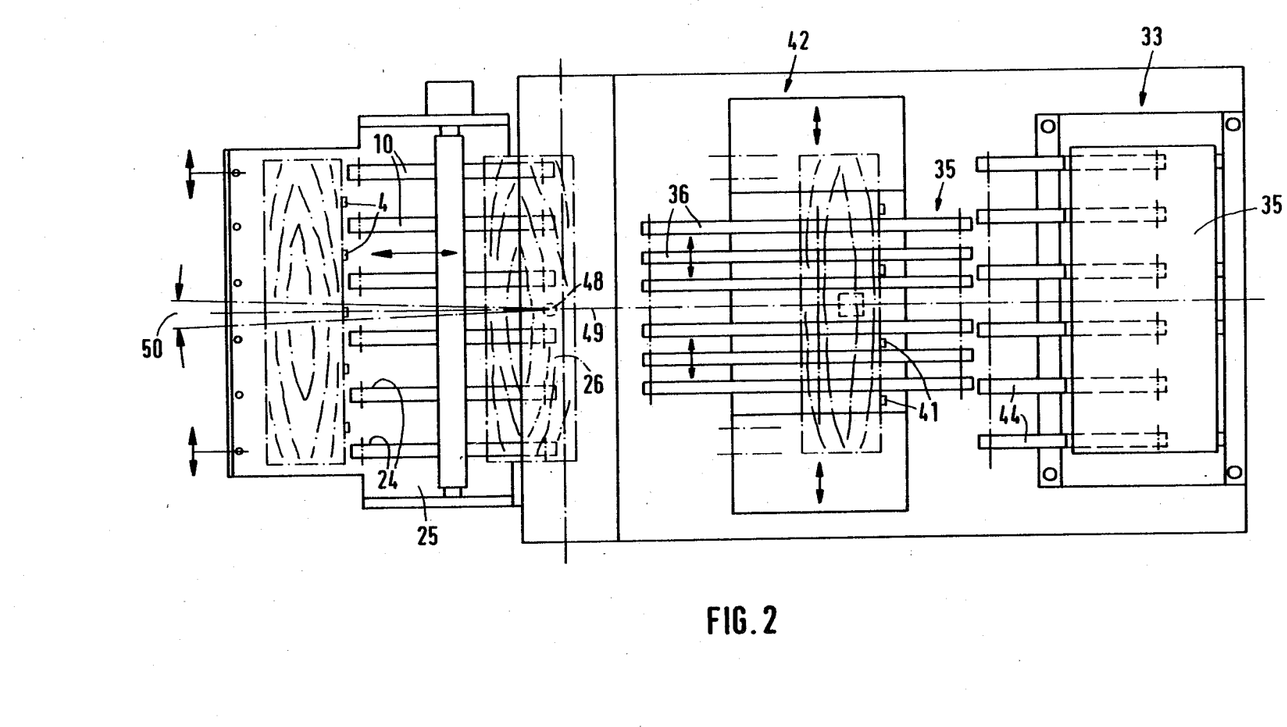
FIG. 2 is a top plan view of the machine shown in FIG. 1.

FIGS. 1 and 2 illustrate a machine in accordance with the invention which may include several modifications according to various features of the invention.

Referring to FIG. 1, a stack 3 of veneers is placed on a slide or carriage 1 of a transfer mechanism 2, and applies against a register stop 4. This stop is lowerable or tiltable so that upon bringing the stack 3 in register, the stop 4 may be moved out of its working position shown in FIG. 1. For this purpose stop 4 is shown pivotally mounted to the end of a guide 6. The slide or carriage 1 can be displaced from its initial position shown in FIG. 1 along the guide 6 in the direction of arrow 5. A director light 7 from light source 54 and indicated by an arrow is provided, illuminating the right-hand edge zone of the stack in a line. The director light is slightly retracted or upstream relative to the stop surface of register stop 4, in the direction of arrow 5, by a so-called minimum joint loss. This means that with the stack applying against register stop 4, the director light line is visible on the top surface of the stack in most instances over its entire length. If the operator finds out that not more than the minimum joint loss is to be cut off to obtain a satisfactory edge on the lengthwise front side of the stack, the first lengthwise cutting line is determined in a manner to be described later. Thereupon, with stop 4 down and by means of the slide or carriage 1, the veneer stack 3 is moved in the direction of arrow 5 farther until director light 7 comes to illuminate the rear edge zone of the veneer stack, considered in the feed direction. Again as little as possible of the rear edge zone is to be cut off. As soon as, in the operator's opinion, the director light now correctly indicates the second lengthwise cut line, slide 1 is stopped and the second lengthwise cutting line is determined. Similarly, particularly also prior to determining the second lengthwise cutting line, the two transverse cutting lines may be determined by means of a director light. With the application of a marking line by a marking device 55, the process is analogous.

Between a trimming machine 8 and the transfer mechanism 2, a hold-turn-feed mechanism 9 is provided. Substantial elements thereof are an upper and a lower endless conveyor belt 10, 11 with the upper one being trained over two tail rollers 12,13 and the lower one over two tail rollers 14,15. Between the belts, a gap 16 is formed in which the veneer stack is received and which can be enlarged by displacing the upper belt upwardly and the lower belt downwardly. For this purpose, preferably, adjusting devices 17,18 are provided which are shown only as blocks. There may be hydraulic cylinders for example, with pistons connected to a frame for supporting the rollers and belts.

Instead of single wide belts 10,11, it is advisable to provide both above and below, groups of equidistantly spaced narrow belts as shown in FIG. 2. Thus, the tail rollers may also be individual narrow rollers. It may further be learned from FIG. 2 that register stop 4 is designed as a fork-like row of stop elements which, in the shown embodiment, are in staggered position relative to belts 10,11.

Prior to introducing a veneer stack 3 into hold-turn-feed mechanism 9, the working section 19 of lower belt 11 is lowered. After tilting register stop 4, the veneer stack can be introduced into gap 16 without obstacles. Should the automatically adjusted minimum joint loss be insufficient for a neat first lengthwise cut, the stack is advanced into the gap already prior to determining the first lengthwise cutting line. In any case, however, at the time the second lengthwise cutting line is being determined, veneer stack 3 is already far in the gap 16. If now the working section 19 of lower belt 11 is lifted, the veneer stack becomes transferred from the slide or carriage 1 to the belt, and the slide or carriage 1 without the stack can now be retracted against the direction of arrow 5 into its initial position. Simultaneously, with the lifting of conveyor belt 11 (e.g. using adjusting device 18), the stack may already become clamped between the two belts. If needed, however, the upper belt may be lowered in addition, simultaneously or subsequently. The stack is then held fast and can be advanced in the direction of arrows 20 and 21 by the correspondingly driven belts toward the trimming machine 8.

While holding the stack 3 fast, the working section 19 of lower conveyor belt 11 extends about at the level of the supporting surface 22 of slide or carriage 1. The axis of rotation 23 embodied by a shaft or journal, of hold-turn-feed mechanism 9 also extends at the same level. The working sections 19 of the individual lower belts 11 run in grooves 24 of a working table 25 of mechanism 9. Upon slackening the belts, for example by moving the tail rollers toward each other, the working sections of the belts are lowered into the grooves and the veneer stack comes to rest against the table. Upon tightening the belts again, the belts emerge from the grooves and with a correct position of the upper belts 10, the veneer stack is again clamped between the two groups of belts.

The axis 23 of the hold-turn-feed mechanism 9 is spaced from the plane of director light 7 by the same distance as it is spaced from a cutting plane 26. The distances are parameters which can be utilized for an automatic feed control. With the second lengthwise cutting line determined, thus with the known distance between the two lengthwise cutting lines, the advance up to the correct position of the first lengthwise control line in cutting blade 26 is given by the spacing between a cutting blade 28 and the director light plane 7 minus the spacing between the two lengthwise cutting lines.

While determining the first and the second lengthwise cutting lines, the determined position data may be supplied to a computer where also the relevant position data of the machine are stored. At the same time, the operator has to take up the instantaneous position of the veneer stack relative to the plane of director light 7 or another reference plane, and the computer computes the distance of advance to bring the first lengthwise cutting line into cutting plane 26. The computer controls the drive motors of belts 10,11 i.e. their start and stop. The same goes for the following cutting along the transverse cutting lines at the two ends of the stack. The determined data of the lengthwise and transverse cutting lines may also be transmitted by the computer to a printer, to print them onto an adhesive tape affixed after the lengthwise trimming. The data may also be printed on accompanying paper, such as an invoice etc.

After the first lengthwise cut, the hold-turn-feed mechanism is turned, for example, in the direction of arrow 27 through 180°, to associate it again with the transfer mechanism. The conveyor frames, table 25 and devices 17,18 are all connected together to rotate about axis 23 as a unit. Then, the trimmed edge comes into the plane of director light 7, and belts 10,11 must displace the stack again through the same distance toward the cutting plane 26.

This is also controlled by the computer. During the turning, the stack remains firmly clamped in mechanism 9, so that the individual veneers of the stack cannot become displaced relative to each other.

Since during the first lengthwise trimming, the stack is in a position substantially above the axis of rotation 23, the turning upside down brings it to a level below that axis. To return the stack to a correct level relative to the cutting blade 28 and an opposite cutting bar 29 or a counterblade, the two conveyor belts along with the stack 3 must be lifted in the direction of arrow 30 (e.g. using devices 17,18) by the height of the stack. This may be done simultaneously with the turning. Care must be taken, however, to hold the stack with the same clamping force during all these movements. If stacks of different heights are handled, no rigid coupling between the upper and lower conveyor belts can be provided.

The mutual distance of the working sections of the two conveyor belts with the stack firmly clamped therebetween may be ascertained by means of a suitable distance measuring device and supplied, along with the veneer thickness data, to the computer which then can compute both the number of veneers in the stack and the total surface area of the veneers remaining after the trimming on four sides. These data may be printed and otherwise utilized. The thickness or height of the veneer stack may also be measured at another location such as at the pressure bar 29. The distance measuring device may be sensors 52 and 53 on devices 17 and 18 which act as means for determining the height of the stack 3 between belts 10 and 11 with the aid of the computer.

Aside from the mentioned cutting blade 28 and the liftable and lowerable cutting bar 29 or a corresponding counterblade, the trimming machine 8 also comprises a pressure bar 31.

The machine operates as follows:

After measuring and clamping, the stack is fed to the cutting plane 26 where the cutting bar 29 is lowered and the pressure bar 31 is lifted. With the first lengthwise cutting line arriving at the cutting plane, belts 10,11 are stopped, cutting bar 29 is lifted and with a minimum delay, pressure bar 31 is lowered. The stack thus becomes compressed in addition by the pressure bar in the zone of the first lengthwise cutting line. Then the cutting blade 28 is actuated, i.e. the stack is trimmed along the first cutting line. If the forming of a block out of the stack is provided, glue is applied over the entire cut edge of the stack.

Thereupon, pressure bar 31 is lifted and at the same time, cutting bar 29 is lowered again. The trimmed stack is then displaced from its position at tail rollers 13,15 to a position at tail rollers 12,14 by driving the belts through a corresponding distance in this opposite direction, Simultaneously, hold-turn-feed mechanism 9 is turned, for example in the direction of arrow 27. This turning is accomplished shortly before the displacement of the stack against the direction 20,21 is terminated, so that only a minimum feed to the cutting plane 26 remains.

Again, the cutting bar is lifted, the pressure bar is lowered simultaneously or with a slight delay and the trimming is effected along the second lengthwise cutting line. Cutting bar 29 is then lowered and the belts may be loosened, for example by lifting the now upper belt 11. The stack remains compressed, since the pressure bar 31 is still in its lowered position.

During the entire operation, another stack of veneers may be placed on slide or carriage 1, aligned and displaced to the register stop 4.

If a gluing of the first stack is provided, the same is now done on the trimmed second edge. Then the pressure bar 31 is lifted and the first stack is conveyed farther in the manner described hereinafter. Adhesive tape, for example, can then be applied to the trimmed edge by device 34.

Already during the gluing and removal of the first veneer stack, the cutting lines of the next stack are determined. The entire preceding operation up to the removal of the first veneer stack takes about 25 seconds.

Upon being glued the veneer stack is removed to be conveyed to a veneer jointing machine of known design. Since the speed of the trimming machine is relatively high, two jointing machines may be associated therewith. The working cycle of a jointing machine, given by the setting time of the glue, is necessarily longer than the cycle of the trimmer, and the removed stacks may be discharged, for example, to jointing machines at the right and the left.

If the trimming machine is used only for what is called squaring of the veneer stacks, the finished trimmed stacks must be prepared for transportation. This is not done individually. Rather more stacks are piled up, for example on pallets 32 of a delivery mechanism 33. Referring still to the previous description, it may be noted that a gluing device 34 is diagrammatically shown in FIG. 1.

An additional conveying mechanism 35 is provided between trimming machine 8 and delivery mechanism 33. Conveying mechanism 35 comprises an endless conveyor belt 36 which again, as shown in FIG. 2, may be embodied by a plurality of equidistantly spaced narrower belts. During the cutting operation, the receiving end 37 of additional conveying mechanism 35 is spaced apart from cutting plane 26. This spacing is needed for the removal of cut-off waste for example over a chute 38.

Upon trimming along the second lengthwise cutting line and then lifting of pressure bar 31, the receiving end 37 is advanced in the direction of arrow 39. This shortens the loop 40 of the endless belt 36 and moves roller 51 upwardly into a position 51a. While determining the lengthwise cutting line of the next veneer stack, the first stack is conveyed over receiving end 37 into the additional conveying mechanism 35. Receiving end 37 is then retracted again and the belt is driven to advance the first stack, which is trimmed on its lengthwise edges, to a lowerable stop 41 of an additional trimming mechanism 42. There, the stack is trimmed along the previously determined transverse cutting lines, which operation is similar to that performed by trimming machine 8. There is a difference, however, in that a cutting device, or preferably a cutting device associated with each of the two ends of the stack, must be aligned with the respective transverse cutting line, particularly with a corresponding control by the computer. This may be achieved, for example, by means of an indicated transverse feed device 43 comprising a threaded spindle and a corresponding nut, for example. Consequently, the additional trimming machine comprises at least one pressure bar 41, a lowerable cutting bar or a corresponding counterblade, and a feed-in cutting blade, with all these elements preferably being duplicated, to trim both ends simultaneously.

During the determination of the cutting line of the second stack, after delivering the first veneer stack, conveyor belt 10,11 may be set to a "zero" position, to avoid addition of errors.

Upon trimming the first veneer stack transversely on its ends, it is transferred by endless belt 36 to another conveyor belt 44 of delivery mechanism 33, which is extensible and retractable, as indicated in broken lines and by arrow 45, in the same way as belt 36.

The first, finished trimmed veneer stack is delivered to a pallet 32 (in FIG. 1 the right hand most stack). Since the width of each stack is stored in the computer, the delivery end 46 of mechanism 33 can be retracted under the control of the computer each time to an extent so as to deposit unequally wide individual stacks automatically in equidistantly spaced positions. After depositing one row of stacks, pallet 32 is lowered, and the next stack may be deposited, for example in staggered position, still under computer control. Advantageously, the heights of the individual veneer stacks also are stored in the computer, so that the pallet may be lowered to the correct level, for example, for the highest veneer stack.

FIG. 2 shows that in the shown example, not only endless belt 36 but also additional belt 44 are embodied by individual narrow belts, which is analogously true for the rollers and the lower stops.

For reasons of clarity, transverse trimming devices 47 and additional trimming machines 42 are not shown in FIG. 2.

However, it may be learned from FIG. 2 that a pivotal axis 48 is provided extending in the cutting plane 26 and intersecting with the longitudinal central axis 49 of the assembly. About this axis 48, transfer mechanism 2 can be pivoted, along with hold-turn-feed mechanism 9, through an angle 50 which is indicated in FIG. 2 by way of example. Preferably, axis 49 bisects angle 50.

The pivoting makes it possible to form an angle between the first and the second lengthwise cutting lines, so that a trapezoidal surface area of the veneer stack is obtained. Register stop 4 is pivoted along, of course, but director light 7 remains fixed, i.e. the plane of the director light extends, as before, parallel to cutting plane 28. This is to optimally utilize the material.

At least in the transverse direction, the cutting may be effected also by means of a saw, instead of a cutting blade. Cutting may even be considered with a water jet or a laser beam, etc. In such instances, the cutting blade and cutting bar are replaced by other devices.

Advantageously, to determine the surface area, the respective area projected onto the surface supporting the veneer stack is measured, which, as a rule, corresponds to the gross area of a veneer sheet. This may be done by means of the same device with which the cutting lines are determined or marked. The yield in veneer surface area is thus ascertained, to be used for further purposes, such as accounting, etc.

While specific embodiments of the invention have been shown and described in detail to illustrate the application of the principles of the invention, it will be understood that the invention may be embodied otherwise without departing from such principles.

What is claimed is:

1. A machine for trimming the longitudinal edges of a stack of veneers comprising, determining means for determining at least one lengthwise reference line for cutting an edge of the stack at a cutting plane, a turning mechanism (9) having an entrance end at an axis of rotation (23) parallel to a surface of the stack for turning the stack and having means for holding the veneer stack (3), with said determining means (2,7) being provided at the entrance end of the turning mechanism, said turning mechanism having an exit end, and trimming means at the exit end of said turning mechanism for trimming the stack at the cutting plane.

2. A machine according to claim 1, wherein said turning mechanism (9) includes means for advancing the veneer stack (3) into the cutting plane (26) which is controllable by data from said determining means (2,7).

3. A machine according to claim 1, wherein said turning mechanism (9) includes means for feeding the stack (3).

4. A machine according to claim 3, including a transfer mechanism (2) for feeding stacks to said turning mechanism and a register stop (4) for stopping feeding of stacks at a selected location on said transfer mechanism.

5. A machine according to claim 4, wherein said transfer mechanism (2) forms a part of said determining means (2,7) and said determining means is equipped with one of a director light (7) and a marking unit for marking the reference line.

6. A machine according to claim 5, wherein said director light (7) is fixed relative to the cutting plane, said register stop (4) being mounted in firm relation to said director light (7) and being lowerable, and said transfer mechanism (2) being displaceable back and forth between two end positions in a feed path for stacks to said turning mechanism (9).

7. A machine according to claim 6, wherein said register stop (4) is offset relative to a plane of said director light (7), toward said turning mechanism (9), by a minimum joining loss distance for a stack to be trimmed.

8. A machine according to claim 4, wherein said turning mechanism (9) comprises two oppositely circulating endless conveyor means (10,11) having a gap (16) therebetween and which are trained each about front and rear tail roller means (12,13,14,15) with sections of said conveyor means extending in parallel, and being drivable in both the forward and reverse directions.

9. A machine according to claim 8, including means for mounting said two oppositely circulating endless conveyor means for movement apart from each other for enlarging said gap (16).

10. A machine according to claim 8, wherein said two oppositely circulating endless conveyor means comprise an upper conveyor and a lower conveyor, each of said upper and lower conveyors having an upper and lower parallel section, said axis of rotation (23) of said turning mechanism (9) extending approximately at said upper section of said lower conveyor, and means for mounting said upper and lower conveyors for synchronized movement toward and away from each other for changing said gap.

11. A machine according to claim 8, wherein a supporting surface of the lower conveyor means extends at about the same level as a supporting surface (22) of said transfer mechanism (2).

12. A machine according to claim 6, wherein said cutting plane (26) extends at a distance from the axis of rotation (23) of said turning mechanism (9), which is equal to the spacing of said director light (7) plane from said axis (23).

13. A machine according to claim 4, wherein said turning mechanism (9) and said transfer mechanism (2) are together pivotable, within selected limits and in both directions starting from a median normal position with respect to a feed path of the stacks, about a vertical axis (28) which is perpendicular to the axis of rotation (23) of said turning mechanism (9) as well as to a plane in which the stacks extend.

14. A machine according to claim 47, wherein said trimming means (8) are on a side of said turning mechanism (9) opposite from said determining means (2,7), said trimming means including a cutting blade (28) operable in said cutting plane (26), a liftable pressure bar (31) and a lowerable cutting bar (29) disposed in a position, considered in the feed direction (20) of stacks downstream of said turning mechanism (9) and upstream of said cutting blade (28).

15. A machine according to claim 14, including an additional conveying mechanism (35) which can be aligned with said turning feed mechanism (9) and brought into working position provided downstream of said cutting plane (26), considered in the feed direction (20) of stacks.

16. A machine according to claim 15, wherein said additional conveying mechanism (35) bridges a space between said trimming means (8) for cutting lengthwise edges of a stack (3) and an additional device (42) for trimming at least one transverse edge of a stack.

17. A machine according to claim 16, wherein said additional trimming device (42) has two side trimming means for cutting both transverse edges of a stack.

18. A machine according to claim 1, wherein said determining means (2,7) has means to determine and marking two lengthwise and two transverse lines on a stack.

19. A machine according to claim 16, wherein said additional trimming device (42) comprises a lowerable register stop (41) for a lengthwise stack edge leading in the feed direction (20).

20. A machine according to claim 16, wherein said additional trimming device (42) is equipped at either side thereof with a cutting unit (47) which can be fed in a lengthwise direction of a stack (3), and which comprises at least one in-feed pressure bar, one in-feed cutting bar, and one in-feed cutting blade.

21. A machine according to claim 16, wherein said additional trimming device (42) is followed in the feed direction (20) by a delivery mechanism (33) with a receiving portion which is associated with a discharge end (36) of said additional conveying mechanism (35), while the position of the discharge end (46) thereof is variable relative to said receiving portion.

22. A machine according to claim 4, wherein said transfer mechanism (2) is controlled by a position transmitter cooperating with said determining means (2,7), with a distance between two positions of the stack (3) during determination of the two lengthwise cutting lines forming a control parameter for the feed motion of the stack.

23. A machine according to claim 22, wherein said position transmitter marks a zero position of displacement of said transfer mechanism (2) during a determination by said determining means (2,7) of a first lengthwise cutting line.

24. A machine according to claim 16, including two measuring units for determining transverse lines to be cut on a stack, said units equipped with at least one position transmitter for measuring a mutual spacing of the transverse lines.

25. A machine according to claim 24, wherein said position transmitter is connected to a computer for determining the area of each of the trimmed veneers of a veneer stack (3).

26. A machine according to claim 25, wherein said computer for determining the area of the veneers is connected to a printer for printing information corresponding to the area.

27. A machine according to claim 25, including means for determining the height of a stack (3) which is held during the trimming.

28. A machine according to claim 27, wherein said means for determining the height of a stack is connected to said computer, to determine the entire surface area of the veneers.

29. A method of trimming a stack of veneers on at least two lengthwise edges thereof, comprising, turning the stack through 180° between two cutting operations for cutting the edges, and determining two lengthwise cutting lines for the edges prior to introducing the stack into a cutting area of a trimming machine, during the determination, measuring the distance of each of the lines from a cutting plane of the trimming machine, displacing the stack into the trimming machine through a distance equal to the spacing of a first of the cutting lines from the cutting plane, trimming the stack at the cutting plane and at the first of the cutting lines, turning the stack upside down as it is being firmly held by means of a turning mechanism, displacing the stack through a distance equal to the spacing of a second one of cutting lines from the cutting plane, and trimming the stack at the cutting plane and at the second of the cutting lines.

30. A method according to claim 29, including marking the two lengthwise cutting lines, or reference lines that are parallel thereto and offset therefrom by a predetermined distance, on the stack prior to introducing the stack into the cutting area of the trimming machine, and introducing the stack into the trimming machine until the first line reaches the sight plane of a detector device, with the stack being held fast and simultaneously turned upside down by means of the turning mechanism and then advanced through the measured distance of the respective cutting line or reference line from the sight plane of the detector device.

31. A method according to claim 29, wherein both of the lengthwise cutting lines are determined prior to introducing the stack into the turning mechanism.

32. A method according to claim 29, including determining two transverse cutting lines prior to introducing the stack into the turning mechanism.

33. A method according to claim 29, including displacing the stack after determining the first lengthwise cutting line, by means of the turning mechanism, and interrupting feed motion of the mechanism to determine the second lengthwise cutting line.

34. A method according to claim 29, including displacing the stack after determining the first lengthwise cutting line and two transverse cutting lines, by means of the turning mechanism which is controllable through determining devices toward the cutting plane, and interrupting feed motion of the stack to determine the second lengthwise cutting line.

35. A method according to claim 29, including determining the lengthwise cutting lines by means of a stationary director light determining device which is provided at the entrance of the turning mechanism.

36. A method according to claim 29, including pivoting the veneer stack an axis perpendicular to a top surface of the stack, and determining a non-parallel cutting line thereon.

37. A method according to claim 29, including determining at least one of the lengthwise lines of a second stack while a first stack is being trimmed along its second lengthwise cutting line.

38. A method according to claim 37, including introducing the second stack after loosening the hold of the turning mechanism and prior to removing the first stack.

39. A method according to claim 37, including applying at least one adhesive tape to the stack prior to releasing the turning mechanism.

40. A method according to claim 39, including transferring the stack trimmed on its lengthwise edges to a transversely trimming device, and aligning the stack at a register stop at the transversely trimming device.

41. A method according to claim 40, including using two transversely trimming units that are adjustable through the determining stop.

42. A method according to claim 41, including transmitting data for the lengthwise transverse cutting line by means of a determining device to a computer, to determine the area of a veneer sheet.

43. A method according to claim 42, including determining the mutual distance of two conveyor means of the turning mechanism in their arrested position and entering the determined data into the computer, and using a printer for printing information corresponding to the area of a veneer sheet.

44. A method according to claim 29, including transmitting mutual spacing-data of the two lengthwise cutting lines to a delivery mechanism, with the discharge end of a conveyor belt of the delivery mechanism being displaced prior to transferring a stack onto a pallet for holding a stack, by at least the width of the stack.

45. A method according to claim 44, including making the delivery mechanism liftable and lowerable and using the stack height data of transferred stacks for controlling the position in height of a lifting device of the delivery mechanism.

46. A method according to claim 29, including measuring the area of the veneer stack as projected onto a supporting surface thereof and supplying the area information to a computer.

* * * * *